(12) United States Patent
Matsunaga et al.

(10) Patent No.: US 9,045,658 B2
(45) Date of Patent: Jun. 2, 2015

(54) CURING ACCELERATOR FOR OXIDATIVE POLYMERIZATION TYPE UNSATURATED RESINS, PRINTING INK AND COATING MATERIAL

(71) Applicant: DIC Corporation, Tokyo (JP)

(72) Inventors: Shigeki Matsunaga, Ichihara (JP); Hiroaki Nakano, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/359,390

(22) PCT Filed: Nov. 16, 2012

(86) PCT No.: PCT/JP2012/079788
§ 371 (c)(1),
(2) Date: May 20, 2014

(87) PCT Pub. No.: WO2013/077267
PCT Pub. Date: May 30, 2013

(65) Prior Publication Data
US 2014/0323646 A1    Oct. 30, 2014

(30) Foreign Application Priority Data

Nov. 22, 2011 (JP) ................................. 2011-254975

(51) Int. Cl.
| | |
|---|---|
| *C09D 11/30* | (2014.01) |
| *C08F 283/01* | (2006.01) |
| *C08F 242/00* | (2006.01) |
| *C08F 120/20* | (2006.01) |
| *B01J 31/04* | (2006.01) |
| *C08F 4/72* | (2006.01) |
| *B01J 27/24* | (2006.01) |
| *B01J 31/12* | (2006.01) |
| *B01J 31/00* | (2006.01) |
| *C08J 3/24* | (2006.01) |
| *C08L 91/00* | (2006.01) |
| *C08L 67/08* | (2006.01) |
| *C09D 11/107* | (2014.01) |
| *C09D 11/105* | (2014.01) |
| *C09D 167/08* | (2006.01) |
| *C09D 11/06* | (2006.01) |
| *C09D 7/12* | (2006.01) |
| *C09D 191/00* | (2006.01) |
| *C09D 11/00* | (2014.01) |
| *C08K 5/098* | (2006.01) |
| *C08K 5/17* | (2006.01) |
| *C09D 11/03* | (2014.01) |
| *C09D 11/102* | (2014.01) |

(52) U.S. Cl.
CPC .............. *C09D 11/30* (2013.01); *C08F 283/01* (2013.01); *C08F 242/00* (2013.01); *C08F 120/20* (2013.01); *B01J 31/04* (2013.01); *C08F 4/72* (2013.01); *B01J 27/24* (2013.01); *B01J 31/128* (2013.01); *B01J 31/00* (2013.01); *C08F 2810/20* (2013.01); *C08F 2410/00* (2013.01); *B01J 2231/32* (2013.01); *C08J 2367/08* (2013.01); *C08L 2312/00* (2013.01); *C08J 3/24* (2013.01); *C08J 2391/00* (2013.01); *C08L 91/005* (2013.01); *C08L 67/08* (2013.01); *C09D 11/107* (2013.01); *C09D 11/105* (2013.01); *C09D 167/08* (2013.01); *C09D 11/06* (2013.01); *C09D 7/1208* (2013.01); *C09D 191/005* (2013.01); *C09D 11/00* (2013.01); *C08K 5/098* (2013.01); *C08K 5/17* (2013.01); *C09D 11/03* (2013.01); *C09D 11/102* (2013.01)

(58) Field of Classification Search
CPC ............ B01J 27/24; B01J 31/00; B01J 31/04; B01J 31/128; B01J 2331/32; C08F 4/72; C08F 120/20; C08F 242/00; C08F 283/01; C08F 2410/00; C08F 2810/20; C08J 3/24; C08J 2367/08; C08J 2391/00; C08K 5/098; C08K 5/17; C08L 67/08; C08L 91/005; C08L 2312/00; C09D 7/1208; C09D 11/03; C09D 11/06; C09D 11/102; C09D 11/105; C09D 11/107; C09D 167/08; C09D 191/005; C09D 11/30; C09D 11/00
USPC ......... 523/160, 161; 106/31.34, 31.35, 31.66, 106/31.67, 222, 310
See application file for complete search history.

(56) References Cited

U.S. PATENT DOCUMENTS 2,565,897 A      8/1951 Wheeler
8,460,448 B2 *   6/2013 Matsunaga et al. ......... 106/31.34

FOREIGN PATENT DOCUMENTS

JP         2001-049102 A     2/2001

OTHER PUBLICATIONS

International Search Report dated Jan. 29, 2013, issued for PCT/JP2012/079788.

*Primary Examiner* — Patrick Niland
(74) *Attorney, Agent, or Firm* — Locke Lord LLP

(57) ABSTRACT

An object of the present invention is to provide a curing accelerator for an oxidative polymerization-type unsaturated resin which can decrease the amount of use of a cobalt metal soap and which has curing performance equal to or higher than the excellent curing performance of a cobalt metal soap, and also provide a printing ink and a coating material using the curing accelerator. The present invention provides a curing accelerator, and a printing ink and a coating material containing the curing accelerator, the curing accelerator including a fatty acid manganese salt (A), an aminoalcohol (B) represented by general formula (1) below, and at least one fatty acid metal salt (C) selected from the group consisting of a fatty acid bismuth salt, a fatty acid zirconium salt, a fatty acid barium salt, and a fatty acid iron salt.

(1)

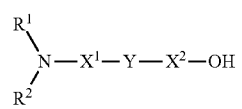

20 Claims, No Drawings

CURING ACCELERATOR FOR OXIDATIVE POLYMERIZATION TYPE UNSATURATED RESINS, PRINTING INK AND COATING MATERIAL

TECHNICAL FIELD

The present invention relates to a curing accelerator exhibiting excellent curability of an oxidative polymerization-type unsaturated resin, and a printing ink and a coating material using the curing accelerator.

BACKGROUND ART

In the field of printing inks, coating materials, and the like, which use oxidative polymerization-type resins as constituent components, a dryer is added as a curing accelerator for drying the resins. Dryers generally used for the resins include metal salts (may be abbreviated as "metal soaps" hereinafter) of heavy metals, such as cobalt, manganese, lead, iron, zinc, and the like, with various carboxylic acids.

Coating materials containing oxidative polymerization-type resins are usually applied outdoor, and thus it is desired to enhance working efficiency of outdoor coating by curing the coating materials within a short time at outside air temperature from a low temperature to room temperature throughout one year. Therefore, organic acid metal salts of cobalt, manganese, and the like, which have relatively high curing acceleratory, are mainly used as a curing accelerator (dryer) for oxidative polymerization-type resins.

Cobalt metal soaps have excellent drying performance, but when they are used in a large amount for shortening a drying time, surface drying of printing inks and coating materials very rapidly proceeds, and thus the problem of wrinkling and shrinkage due to skinning occurs, thereby causing difficulty in satisfying both the short drying time and the prevention of wrinkling and shrinkage due to skinning.

In addition, from the viewpoints that cobalt compounds used as raw materials of cobalt metal soaps are concerned about carcinogenicity because they are listed in Group 2B "Possibly carcinogenic to humans" in the list of carcinogenic risks of the International Agency for Research on Cancer and that cobalt metal soaps highly cost because metallic cobalt is a rare metal and thus suffers from unstable supply, there is a demand for a curing accelerator having high curing performance using the cobalt metal soap in a smaller amount.

Therefore, as a drying accelerator having high drying performance using a smaller amount of the cobalt metal soap, a drying accelerator containing a cobalt metal soap, a manganese metal soap, and at least one aminoalcohol selected from diethanolamine, diethylethanolamine, dibutylethanolamine, and n-butyldiethanolamine has been proposed (refer to, for example, Patent Literature 1). However, the cobalt metal soap is still used, and thus the problem of concern about carcinogenicity, unstable supply of the raw material, and high cost cannot be resolved.

In addition, a drying accelerator (curing accelerator) using manganese soap in combination with bipyridyl has been proposed, prior to disclosure of Patent Literature 1, as a method for further shortening the drying time while preventing wrinkling and shrinkage due to skinning without using cobalt metal (refer to for example Patent Literature 2). However, the drying accelerator described in Patent Literature 2 has the advantage of not using a cobalt metal soap, but has the problem of increasing the drying time when used as a curing accelerator for a printing ink and a coating material.

CITATION LIST

Patent Literature

PTL 1: Japanese Unexamined Patent Application Publication No. 2001-49102
PTL 2: U.S. Pat. No. 2,565,897

SUMMARY OF INVENTION

Technical Problem

A problem to be solved by the present invention is to provide a curing accelerator for an oxidative polymerization-type unsaturated resin which can further decrease the amount of use of a cobalt metal soap concerned about influences on human bodies and which has the drying performance equal to or higher than the excellent drying performance of a cobalt metal soap, and also provide a printing ink and a coating material using the curing accelerator.

Solution to Problem

As a result of repeated intensive research, the inventors of the present invention found that the above problem can be solved by using a non-cobalt fatty acid manganese salt as a fatty acid metal salt in combination with a specified aminoalcohol and at least one fatty acid metal salt selected from the group consisting of a fatty acid bismuth salt, a fatty acid zirconium salt, a fatty acid barium salt, and fatty acid iron, resulting in the achievement of the present invention.

The present invention provides a curing accelerator for an oxidative polymerization-type unsaturated resin, the curing accelerator including a fatty acid manganese salt (A), an aminoalcohol (B) represented by general formula (1) below,

[Chem. 1]

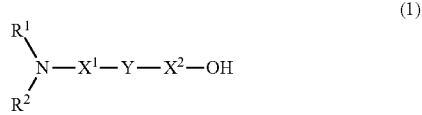

(1)

(in the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents $-NR^3-$ (wherein $R^3$ represents a hydrogen atom or an alkyl group having 1 to 6 carbon atoms) or an oxygen atom), and at least one fatty acid metal salt (C) selected from the group consisting of a fatty acid bismuth salt, a fatty acid zirconium salt, a fatty acid barium salt, and a fatty acid iron salt.

Also, the present invention provides a printing ink including the curing accelerator for an oxidative polymerization-type unsaturated resin and an oxidative polymerization-type unsaturated resin.

Further, the present invention provides a coating material including the curing accelerator for an oxidative polymerization-type unsaturated resin and an oxidative polymerization-type unsaturated resin.

Advantageous Effects of Invention

A curding accelerator for an oxidative polymerization-type unsaturated resin of the present invention has the excellent curing performance of having a short curing time while resolving the problem of concern about carcinogenicity, unstable supply of a raw material, and high cost. Therefore, the curing accelerator can be preferably used as a curing accelerator for an oxidative polymerization drying-type printing ink, such as a lithographic ink, and a coating material.

DESCRIPTION OF EMBODIMENTS

A curing accelerator for an oxidative polymerization-type unsaturated resin of the present invention includes a fatty acid manganese salt (A), an aminoalcohol (B) represented by general formula (1) below,

[Chem. 2]

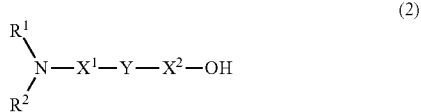

(2)

(in the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents $—NR^3—$ (wherein $R^3$ represents a hydrogen atom or an alkyl group having 1 to 6 carbon atoms) or an oxygen atom), and at least one fatty acid metal salt (C) selected from the group consisting of a fatty acid bismuth salts, a fatty acid zirconium salt, a fatty acid barium salt, and a fatty acid iron salt.

The fatty acid manganese salt (A) is a manganese salt of a fatty acid, and examples of the fatty acid include octylic acid, naphthenic acid, neodecanoic acid, isononanoic acid, tung oil acid, linseed oil acid, soybean oil acid, resin acid, tall oil fatty acid, and the like. These fatty acid manganese salts (A) can be used alone or in combination of two or more.

Among the fatty acid manganese salts (A), those of at least one fatty acid selected from octylic acid, neodecanoic acid, isononanoic acid, and naphthenic acid are preferred for the reason of good solubility in solvents used as raw materials of a printing ink and a coating material.

The fatty acid manganese salt (A) can be produced by dissolving a fatty acid as a water-soluble salt, generally a sodium salt, in water, adding a water-soluble manganese salt to the resultant solution, performing ion exchange reaction referred to as "double decomposition", and then performing water-washing, dehydration, and filtration.

The aminoalcohol (B) is a compound represented by the general formula (1) below. In the present invention, use of the aminoalcohol having a structure of the general formula (1) can exhibit the excellent curing performance of having a short drying time (curing time) for a printing ink and a coating material. Also, the occurrence of wrinkling and shrinkage of coating film surfaces due to rapid drying of surfaces of an ink and a coating material can be prevented.

[Chem. 3]

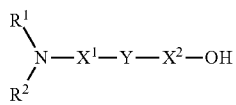

(1)

(In the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents $—NR^3—$ (wherein $R^3$ represents a hydrogen atom or an alkyl group having 1 to 6 carbon atoms) or an oxygen atom.)

The aminoalcohol (B) represented by the general formula (1) preferably contains an alkylene group having 2 to 3 carbon atoms as each of $X^1$ and $X^2$ because it is possible to further shorten the curing time. By using the aminoalcohol (B) in which $X^1$ and $X^2$ are each an alkylene group having 2 to 3 carbon atoms, the occurrence of wrinkling and shrinkage of coating film surfaces due to rapid drying of surfaces of an ink and a coating material can also be prevented.

Specific examples of the aminoalcohol (B) include 2-[(2-dimethylaminoethyl)methylamino]ethanol, 2-(2-aminoethyl)aminoethanol, 1-(2-aminoethyl)amino-2-propanol, 2-(3-aminopropylamino)ethanol, 2-(2-dimethylaminoethoxy)ethanol, and the like. These aminoalcohols (B) can be used alone or in combination of two or more.

In order to further improve the curing performance, the mixing ratio (A)/(B) by mass of manganese metal in the fatty acid manganese salt (A) to the aminoalcohol (B) is preferably in the range of 1/0.1 to 1/30, more preferably in the range of 1/0.3 to 1/20, and still more preferably in the range of 1/0.5 to 1/10.

The fatty acid metal salt (C) used in the present invention is selected from the group consisting of a fatty acid bismuth salt, a fatty acid zirconium salt, a fatty acid barium salt, and a fatty acid iron salt. An oxidative polymerization-type unsaturated resin is cured by polymerization of unsaturated bonds through oxidation with air oxygen. A curing accelerator containing a fatty acid manganese salt generally causes an oxidative polymerization-type unsaturated resin to be cured with oxygen taken in from air by the fatty acid manganese salt. The inventors consider that in the present invention, taking in of oxygen from air by the fatty acid manganese salt (A) is promoted by the fatty acid metal salt (C), thereby improving curability of an oxidative polymerization-type unsaturated resin.

A fatty acid bismuth salt is a bismuth salt of a fatty acid, and examples of the fatty acid include octylic acid, naphthenic acid, neodecanoic acid, isononanoic acid, tung oil acid, linseed oil acid, soybean oil acid, resin acid, tall oil fatty acid, and the like.

A fatty acid zirconium salt is a zirconium salt of a fatty acid, and examples of the fatty acid include octylic acid, naphthenic acid, neodecanoic acid, isononanoic acid, tung oil acid, linseed oil acid, soybean oil acid, resin acid, tall oil fatty acid, and the like.

A fatty acid barium salt is a barium salt of a fatty acid, and examples of the fatty acid include octylic acid, naphthenic acid, neodecanoic acid, isononanoic acid, tung oil acid, linseed oil acid, soybean oil acid, resin acid, tall oil fatty acid, and the like.

A fatty acid iron salt is an iron salt of a fatty acid, and examples of the fatty acid include octylic acid, naphthenic acid, neodecanoic acid, isononanoic acid, tung oil acid, linseed oil acid, soybean oil acid, resin acid, tall oil fatty acid, and the like.

The curability of an oxidative polymerization-type unsaturated resin can be maximized by appropriately changing the content of the fatty acid metal salt (C) in the curing accelerator for an oxidative polymerization-type unsaturated resin according to the type of the fatty acid metal salt used. For example, when at least one fatty acid metal salt (C1) selected from the group consisting of a fatty acid bismuth salt, a fatty acid zirconium salt, and a fatty acid barium salt is used as the fatty acid metal salt (C), the metal salt (C1) is preferably contained so that an amount of a metal in the metal salt (C1) is 1 to 10 parts by mass relative to 1 part by mass of manganese metal in the fatty acid manganese salt (A), and the metal salt (C1) is more preferably contained so that an amount of a metal in the metal salt (C1) is 3 to 7 parts by mass relative to 1 part by mass of manganese metal in the fatty acid manganese salt (A).

When a fatty acid iron salt (C2) is used as the fatty acid metal salt (C), the metal salt (C2) is preferably contained so that an amount of a metal in the fatty acid iron salt (C2) is 0.1 to 2.0 parts by mass relative to 1 part by mass of manganese metal in the fatty acid manganese salt (A), and the metal salt (C2) is more preferably contained so that an amount of a metal in the metal salt (C2) is 0.2 to 1 part by mass relative to 1 part by mass of manganese metal in the fatty acid manganese salt (A).

Besides the fatty acid manganese salt (A) and the fatty acid metal salt (C), another fatty acid metal salt can be added to the curing accelerator for an oxidative polymerization-type unsaturated resin of the present invention within a range in which the effect of the present invention is not impaired. Examples of the other fatty acid metal salt include a fatty acid nickel salt, a fatty acid copper salt, a fatty acid zinc salt, a fatty acid cerium salt, a fatty acid vanadium salt, a fatty acid calcium salt, a fatty acid strontium salt, and the like. Among these, a fatty acid calcium salt or a fatty acid strontium salt (D) is preferred because the curing accelerator excellent in finger-touch dryness of a coating film of an oxidative polymerization-type unsaturated resin can be produced, and a fatty acid calcium salt is more preferred.

The amount of the fatty acid calcium salt or fatty acid strontium salt (D) used is preferably such that an amount of metal in the fatty acid calcium salt or strontium salt (D) is 1 to 5 parts by mass relative to 1 part by mass of manganese metal in the fatty acid manganese salt (A).

The fatty acid bismuth salt which is sold as a commercial product can be used, but if required, the bismuth salt can be produced. The fatty acid bismuth salt can be produced by, for example, adding, to the fatty acid, bismuth or a bismuth compound such as a hydrate, a hydroxide, a carbonate, or the like, and then performing reaction by stirring the resultant mixture in a high-temperature atmosphere. The temperature of reaction is generally 40° C. to 200° C. and preferably 80° C. to 150° C. The time required for reaction is generally 1 to 10 hours and preferably 1 to 5 hours. A molar ratio (fatty acid/bismuth or bismuth compound) of the fatty acid to bismuth or bismuth compound used is generally within a range of 2.0 to 4.0 and preferably within a range of 2.5 to 3.5.

The curing accelerator for an oxidative polymerization-type unsaturated resin of the present invention is preferably used as a solution with good handleability, which is prepared by diluting the fatty acid manganese salt (A), the aminoalcohol (B), and the fatty acid metal salt (C) with a diluent (E). Examples of the diluent include hydrocarbon solvents such as toluene, xylene, heptane, hexane, mineral spirits, and the like; alcohol solvents such as methanol, ethanol, propanol, cyclohexanol, and the like; ketone solvents such as methyl ethyl ketone, methyl isobutyl ketone, cyclohexanone, and the like; ether solvents such as propyl ether, methyl cellosolve, cellosolve, butyl cellosolve, methyl carbitol, and the like; fatty acid esters such as caproic acid methyl ester, capric acid methyl ester, lauric acid methyl ester, and the like; vegetable fats and oils such as soybean oil, linseed oil, rape oil, safflower oil, and the like; and fatty acid esters (E1) represented by general formula (2) below,

[Chem. 4]

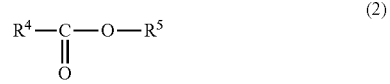

(in the formula, $R^4$ is an alkyl group having 5 to 11 carbon atoms, and $R^5$ is an alkyl group having 1 to 3 carbon atoms); and the like. These diluents can be used alone or in combination of two or more.

The fatty acid ester (E1) is produced by esterification reaction between a carboxylic acid having 6 to 12 carbon atoms and an alcohol having 1 to 3 carbon atoms, and the carbon chains of the carboxylic acid and the alcohol may be linear or branched.

Examples of the fatty acid ester (E1) include caproic acid methyl ester, enanthic acid methyl ester, caprylic acid methyl ester, pelargonic acid methyl ester, capric acid methyl ester, lauric acid methyl ester, caproic acid ethyl ester, enanthic acid ethyl ester, caprylic acid ethyl ester, pelargonic acid ethyl ester, capric acid ethyl ester, lauric acid ethyl ester, caproic acid propyl ester, enanthic acid propyl ester, caprylic acid propyl ester, pelargonic acid propyl ester, capric acid propyl ester, lauric acid propyl ester, and the like. These fatty acid esters can be used alone or in combination of two or more. In addition, among these fatty acid esters, caproic acid methyl ester, capric acid methyl ester, and lauric acid methyl ester are preferred because of their little odors. In particular, lauric acid methyl ester is preferred because decreases in both the viscosity and the odor of a printing ink dryer can be achieved.

In order to produce the curing accelerator having lower viscosity and excellent handleability, the mixing ratio [(A)+(B)+(C)]/(E) by mass of the total of the fatty acid manganese salt (A), the aminoalcohol (B), and the fatty acid metal salt (C) to the diluent (E) is preferably in the range of 10/90 to 95/5, more preferably in the range of 40/60 to 80/20, and still more preferably in the range of 20/80 to 90/10.

A printing ink of the present invention is prepared by mixing the curing accelerator for an oxidative polymerization-type unsaturated resin of the present invention, an oxidative polymerization-type unsaturated resin, and a colorant. A printing ink generally includes varnish (solvent solution of the oxidative polymerization-type unsaturated resin) as a binder resin, a colorant as a pigment or dye, and a diluent for adjusting viscosity and drying property of the printing ink. Examples of the oxidative polymerization-type unsaturated resin used in the varnish include rosin-modified phenol resins, maleic acid-modified phenol resins, unsaturated polyesters, petroleum resins, alkyd resins, and the like.

Examples of the colorant include carbon black, phthalocyanine pigments, red iron oxide, azo pigments, quinacridone pigments, and the like. Examples of the diluent include hydrocarbon solvents such as toluene, xylene, heptane, hexane, mineral spirits, and the like; alcohol solvents such as methanol, ethanol, propanol, cyclohexanol, and the like; ketone solvents such as methyl ethyl ketone, methyl isobutyl ketone, cyclohexanone, and the like; ether solvents such as propyl ether, methyl cellosolve, cellosolve, butyl cellosolve, methyl carbitol, and the like; fatty acid esters such as caproic acid methyl ester, capric acid methyl ester, lauric acid methyl ester, and the like; and vegetable fats and oils such as soybean oil, linseed oil, rape oil, safflower oil, and the like.

An example of a method for producing the printing ink of the present invention is a method of grinding the varnish, the colorant, the diluent solvent, the curing accelerator for an oxidative polymerization-type unsaturated resin of the present invention, and, if required, other additives such as wax and the like with a grinder mill such as a three roll mill. In this case, the printing ink dryer of the present invention is preferably used as being diluted with the fatty acid ester (E1) or vegetable oil/fat.

The amount of the curing accelerator for an oxidative polymerization-type unsaturated resin of the present invention mixed in the printing ink is preferably in the range of 0.001 to 1 part by mass and more preferably in the range of 0.01 to 0.5 parts by mass in terms of manganese atom relative to 100 parts by mass of varnish in the printing ink because the short drying time and the prevention of skinning can be satisfied.

A coating material of the present invention includes the curing accelerator for an oxidative polymerization-type unsaturated resin of the present invention and an oxidative polymerization-type unsaturated resin.

Examples of the oxidative polymerization-type unsaturated resin include oxidative polymerization curing-type alkyd resins, oxidative polymerization curing-type urethane resins, oxidative polymerization curing-type modified epoxy resins, and the like.

Examples of the oxidative polymerization curing-type alkyd resins include ester-based resins composed of a polybasic acid component, a polyhydric alcohol component, and an oil fatty acid as main components.

Examples of a component which is mainly used as the polybasic acid component include dibasic acids such as phthalic anhydride, isophthalic acid, terephthalic acid, tetrahydrophthalic anhydride, hexahydrophthalic anhydride, succinic acid, fumaric acid, adipic acid, sebacic acid, maleic anhydride, and the like; and lower-alkyl esters of these acids. If required, a trivalent or higher polybasic acid such as trimellitic anhydride, methylcyclohexene tricarboxylic acid, pyromellitic anhydride, or the like, sulfophthalic acid, sulfoisophthalic acid, or an ammonium salt, a sodium salt, or a lower alkyl ester of the acid, or the like can also be used. In addition, a monobasic acid such as benzoic acid, crotonic acid, p-tert-butylbenzoic acid, or the like can be used as an acid component for adjusting a molecular weight or the like.

Examples of the polyhydric alcohol component include dihydric alcohols such as ethylene glycol, diethylene glycol, propylene glycol, 1,4-butanediol, neopentyl glycol, 3-methylpentanediol, 1,4-hexanediol, 1,6-hexanediol, and the like. If required, a trihydric or higher polyhydric alcohol such as glycerin, trimethylolethane, trimethylolpropane, pentaerythritol, or the like, a polyhydric alcohol having a polyoxyethylene group, or the like can also be used. These polyhydric alcohols can be used alone or as a mixture of two or more. In addition, the acid component and the alcohol component can be partially substituted by an oxyacid component such as dimethylolpropionic acid, oxypivalic acid, paraoxybenzoic acid, or the like, a lower-alkyl ester of the acid, or lactone such as ε-caprolactone or the like.

Examples of the oil fatty acid include coconut oil fatty acid, soybean oil fatty acid, linseed oil fatty acid, safflower oil fatty acid, tall oil fatty acid, dehydrated castor oil fatty acid, tung oil fatty acid, and the like. An oil length of an alkyd resin is preferably 5 to 80% by mass, particularly within a range of 20 to 70% by mass, in view of curability, toughness, build feeling, and the like of the resultant coating film.

Also, it is possible to use an epoxy-modified alkyd resin produced by partial esterification of an epoxy compound used as a part of the alcohol component, a maleinized alkyd resin produced by introducing maleic anhydride into an alkyd resin, a grafted alkyd resin produced by adding a maleinized alkyd resin and a hydroxyl group-containing alkyd resin, a vinyl-modified alkyd resin produced by graft polymerization of a vinyl monomer, such as styrene, (meth)acrylic acid ester, or the like, to an alkyd resin, or the like.

Further, by using a polyester resin (hereinafter abbreviated as "regenerated PES") such as polyethylene terephthalate (for example, PET bottle) recovered for recycling resources, polyethylene terephthalate industrial waste, polyethylene terephthalate and polybutylene terephthalate composed of terephthalic acid as a main material, or the like, which is composed of terephthalic acid as a main material and is regenerated from scrap and the like produced during manufacture of polyester products (films, fibers, automotive parts, electronic components, etc.), an alkyd resin is produced by dissolving the regenerated PES in a mixture of the alcohol component and the polybasic acid component and then performing depolymerization and esterification reaction. In addition to the resultant alkyd resin, a maleinized alkyd resin produced by reacting the alkyd resin with maleic anhydride, a modified alkyd resin produced by reacting the alkyd resin with an acid anhydride having no ethylenically unsaturated group, and the like can also be used.

The oxidative polymerization curing-type alkyd resins detailed above preferably have a Gardner viscosity (25° C.) of 15 to 60 stokes in view of good curability and coating film physical properties.

The urethane resins are not particularly limited but, for example, a urethane resin produced by reacting polyol, polyol produced by transesterification of oil/fat with polyhydric alcohol, and polyisocyanate can be used.

Examples of the polyisocyanate include aliphatic isocyanates such as 1,4-tetramethylene diisocyanate, 1,6-hexamethylene diisocyanate, 2,2,4-trimethylhexamethylene diisocyanate, 2,8-diisocyanate methyl caproate, and the like; alicyclic diisocyanates such as 3-isocyanatomethyl-3,5,5-trimethylcyclohexyl isocyanate, methylcyclohexyl-2,4-diisocyanate, and the like; aromatic diisocyanates such as tolylene diisocyanate, diphenylmethane diisocyanate, 1,5-naphthene diisocyanate, diphenylmethylmethane diisocyanate, tetraalkyldiphenylmethane diisocyanate, 4,4-dibenzyl diisocyanate, 1,3-phenylene diisocyanate, and the like; chlorinated diisocyanates; brominated diisocyanates; and the like. These can be used alone or as a mixture of two or more.

Examples of the polyol include various polyols generally used for producing urethane resins, such as diethylene glycol, butanediol, hexanediol, neopentyl glycol, bisphenol A, cyclohexane dimethanol, trimethylolpropane, glycerin, pentaerythritol, polyethylene glycol, polypropylene glycol, polyester polyol, polycaprolactone, polytetramethylene ether glycol, polythioether polyol, polyacetal polyol, polybutadiene polyol, furan dimethanol, and the like. These can be used alone or as a mixture of two or more.

The polyol produced by esterification of oil/fat with polyhydric alcohol is, for example, polyol produced by esterification of oil/fat having an iodine number of 7 to 200 with polyhydric alcohol such as trimethylolpropane, pentaerythritol, or the like. Examples of usable commercial products include "XP1076E", "XP1077E", "XP1580E", "FB20-50XB", and the like which are manufactured by Mitsui Chemicals, Inc.

The oxidative polymerization curing-type modified epoxy resin is, for example, a resin produced by reacting an epoxy resin with an unsaturated fatty acid component and an acid group-containing acrylic component as raw materials. In view of excellent physical properties of a cured coating film, the resin raw materials mixed preferably include 30 to 50% by weight of the epoxy resin, 25 to 40% by weight of the unsaturated fatty acid component, and 10 to 45% weight of the acid group-containing acrylic component relative to 100% by weight of a total weight of the raw materials.

The iodine number of the oxidative polymerization curing-type modified epoxy resin is preferably 30 to 100 and particularly preferably 35 to 90 from the viewpoint of achieving good curability.

From the viewpoint of easy modification and excellent performance of the resultant cured coating film, preferred examples of the epoxy resin which can be used as a raw material include, but are not particularly limited to, bisphenol-type epoxy resins such as bisphenol A epoxy resins, hydrogenated bisphenol A epoxy resins, bisphenol F epoxy resins, and the like. These may be used alone or in combination of two or more.

Any one of natural or synthetic unsaturated fatty acids can be used as the unsaturated fatty acid component, and examples thereof include unsaturated fatty acids produced from tung oil, linseed oil, castor oil, dehydrated castor oil, safflower oil, tall oil, soybean oil, and coconut oil, and the like.

In addition, for example, a mixture of (meth)acrylic acid and an acrylic monomer not containing an acid group, such as styrene, (meth)acrylic acid ester, or the like, can be used as the acid group-containing acrylic component. In view of excellent hardness of the resultant coating film, styrene is preferred as the latter acrylic monomer not containing an acid group.

The oxidative polymerization curing-type epoxy resin can be produced as follows. First, an epoxyester resin is produced by using an epoxy resin and an unsaturated fatty acid component. For example, the epoxy resin is reacted with the unsaturated fatty acid component in a proper solvent, such as toluene, xylene, or the like, using a condensation catalyst, if required, in an inert gas atmosphere or nitrogen gas or the like, at 150° C. to 250° C. until a desired acid value is obtained, thereby producing an epoxyester resin. Usable examples of the condensation catalyst include dibutyltin oxide, tetra-n-butyl ammonium bromide, and the like.

Next, the resultant epoxyester resin is reacted with the acid group-containing acrylic component to produce an oxidative polymerization curing-type modified epoxy resin. The epoxyester resin can be reacted with the acid group-containing acrylic component in the presence of a polymerization initiator in an inert gas atmosphere of nitrogen gas or the like within a temperature range of 80° C. to 150° C. Any one of various compounds such as peroxides, azo compounds, and the like can be used as the polymerization initiator, and, for example, "Kayabutyl B (alkyl perester-based)" manufactured by Kayaku Akzo Co., Ltd. or the like can be used at a ratio of 0.1 to 20% by mass relative to a total amount of monomers used.

Among the oxidative polymerization-type unsaturated resins detailed above, in the present invention, the oxidative polymerization curing-type alkyd resins are particularly preferred in view of low cost, easy availability, and excellent drying properties (practicability) of the coating material.

The coating material of the present invention preferably further contains an organic solvent. Examples of the organic solvent which can be used include the above-described hydrocarbon solvents, alcohol solvents, ketone solvents, and ether solvents.

In addition to the components described above, if required, the coating material of the present invention can further contain a colorant such as a pigment or the like, and various additives for coating, such as a pigment dispersant, a surface modifier, an ultraviolet absorber, a defoaming agent, a thickener, an anti-settling agent, and the like.

The amount of the dryer of the present invention mixed in the coating material is not particularly limited, but a total mass of metal components is preferably within a range of 0.005 to 1.5 parts by mass relative to 100 parts by mass of the oxidative polymerization-type unsaturated resin.

A coating film of the present invention can be formed by applying the coating material of the present invention detailed above on a substance to be coated, and drying and curing the coating material according to a usual method. Examples of a substrate (substance to be coated) which can be coated with the coating material of the present invention include steel and the like. In addition, a drying condition (curing condition) after application is, for example, air drying. Further, the coating material of the present invention can exhibit good curability even when the thickness of a coating film is increased, and is thus particularly useful as a coating material for thick coating. Specifically, a cured coating film having a thickness within a range of 1 to 500 μm can be formed. Therefore, the coating material of the present invention is useful as a coating material for building.

EXAMPLES

The present invention is described in further detail below by way of examples. In the examples, "parts" and "%" are on a mass basis unless otherwise specified.

Examples 1 to 9

Preparation of Curing Accelerator for Oxidative polymerization-type Unsaturated Resin A fatty acid manganese salt (A), aminoalcohol (B), a fatty acid metal salt (C), and a diluent (E) were mixed at a ratio (parts by mass) shown in Table 1 and Table 2 to prepare each of curing accelerators 1 to 9 for an oxidative polymerization-type unsaturated resin of the present invention.

TABLE 1

| | Example | | | | |
|---|---|---|---|---|---|
| | 1 | 2 | 3 | 4 | 5 |
| Curing accelerator for oxidative polymerization-type unsaturated resin | 1 | 2 | 3 | 4 | 5 |
| Fatty acid manganese salt (A) | | | | | |
| Manganese octylate | 18 | 27 | 27 | 14 | 5 |
| Aminoalcohol (B) | | | | | |
| 2-[(2-dimethylaminoethyl)methylamino]ethanol | 4 | | 5 | | |
| 2-(2-aminoethyl)aminoethanol | | 5 | | | |
| 1-(2-aminoethyl)amino-2-propanol | | | | 3 | |
| 2-(3-aminopropylamino)ethanol | | | | | 2 |
| 2-(2-dimethylaminoethoxy)ethanol | | | | | |
| Fatty acid metal salt (C) | | | | | |
| Bismuth octylate | 50 | 37 | 37 | | |
| Zirconium octylate | | | | 36 | 42 |
| Barium octylate | | | | | |
| Iron octylate | | | | | |
| Diluent (E) | | | | | |
| Mineral spirit | 13 | 9 | 9 | 36 | 42 |
| Lauric acid methyl ester | | 22 | | 11 | |
| Soybean oil | 15 | | 22 | | 6 |

TABLE 2

| | Example | | | |
|---|---|---|---|---|
| | 6 | 7 | 8 | 9 |
| Curing accelerator for oxidative polymerization-type unsaturated resin | 6 | 7 | 8 | 9 |
| Fatty acid manganese salt (A) | | | | |
| Manganese octylate | 13 | 24 | 33 | 40 |
| Aminoalcohol (B) | | | | |
| 2-[(2-dimethylaminoethyl)methylamino]ethanol | | 5 | 7 | 8 |
| 2-(2-aminoethyl)aminoethanol | | | | |
| 1-(2-aminoethyl)amino-2-propanol | | | | |
| 2-(3-aminopropylamino)ethanol | | | | |
| 2-(2-dimethylaminoethoxy)ethanol | 3 | | | |
| Fatty acid metal salt (C) | | | | |
| Bismuth octylate | | | | |
| Zirconium octylate | | | | |
| Barium octylate | 45 | | | |
| Iron octylate | | 31 | 21 | 13 |
| Diluent (E) | | | | |
| Mineral spirit | 29 | 21 | 14 | 8 |
| Lauric acid methyl ester | 10 | | | |
| Soybean oil | | 19 | 25 | 31 |

Comparative Example 1 (Same as the Above)

A curing accelerator 1' for an oxidative polymerization-type unsaturated resin for comparative reference was prepared by dissolving 56 parts of manganese naphthenate and 18 parts of 2,2'-bipyridyl in 26 parts of mineral spirit.

Comparative Example 2 (Same as the Above)

A curing accelerator 2' for an oxidative polymerization-type unsaturated resin for comparative reference was prepared by dissolving 26 parts of cobalt naphthenate, 21 parts of manganese naphthenate, and 7 parts of diethanolamine in 46 parts of mineral spirit.

Comparative Example 3

A curing accelerator 3' for an oxidative polymerization-type unsaturated resin for comparative reference was prepared by dissolving 19 parts of cobalt naphthenate and 31 parts of zirconium octylate in 50 parts of mineral spirit. The curing accelerator was prepared for the purpose of showing the performance at an average level of metal soaps of related art containing a cobalt metal soap.

Example 10

Preparation of Coating Material

The curing accelerator 1 for an oxidative polymerization-type unsaturated resin was added to 40 g of a mixture produced by kneading with three rolls 1960 g a titanium white pigment ("JR-701" manufactured by Teika Co., Ltd.), 3340 g of a resin for coating "Beckosol P-470-70" (alkyd resin having an oxidative polymerization-type unsaturated fatty acid group in its molecule, manufactured by DIC Corporation), 280 g of mineral spirit, and 20 g of an anti-skinning agent (methyl ethyl ketoxime) so that a ratio of manganese metal was 0.06% relative to 100 parts of resin nonvolatile content, thereby preparing a coating material 1 of the present invention. The drying time of the coating material 1 was measured and evaluated according to a method described below. The evaluation results are shown in Table 3.

<Method for Measuring Drying Time>

A coating material was applied on a glass plate by using a 3-mill applicator and then tested by using a drying time recorder ("Model No. 404" manufactured by Taiyu Kizai Co., Ltd.). Measurement was carried out in a constant temperature and humidity chamber (air temperature of 25° C., relative humidity of 50%). The drying time was defined as a time taken until a scratch, which was produced by a needle of the drying time recorder at the start of drying of the coating material, disappeared by complete drying after the coating material was applied to the glass plate.

Examples 11 to 18 (Same as the Above)

Coating materials 2 to 9 were prepared by the same method as in Example 10 except that the curing accelerators for an oxidative polymerization-type unsaturated resin shown in Table 1 and Table 2 were used. The drying time was measured by the same method as in Example 10, and the results are shown in Table 3 and Table 4.

TABLE 3

| | Example | | | | |
|---|---|---|---|---|---|
| | 10 | 11 | 12 | 13 | 14 |
| Coating material | 1 | 2 | 3 | 4 | 5 |
| Curing accelerator for oxidative polymerization-type unsaturated resin | 1 | 2 | 3 | 4 | 5 |
| Drying time (hour) | 9.1 | 8.9 | 8.6 | 9.7 | 9.0 |

TABLE 4

| | Example | | | |
|---|---|---|---|---|
| | 15 | 16 | 17 | 18 |
| Coating material | 6 | 7 | 8 | 9 |
| Curing accelerator for oxidative polymerization-type unsaturated resin | 6 | 7 | 8 | 9 |
| Drying time (hour) | 8.8 | 9.0 | 9.6 | 9.0 |

Comparative Example 4

A coating material 1' for comparative reference was prepared by the same method as in Example 10 except that instead of using the curing accelerator 1 for an oxidative polymerization-type unsaturated resin, the curing accelerator 1' for an oxidative polymerization-type unsaturated resin was added so that a ratio of a manganese metal component was 0.06% relative to 100 parts of a resin nonvolatile content. The drying time was measured by the same method as in Example 10, and the result is shown in Table 5.

Comparative Example 5

A coating material 2' for comparative reference was prepared by the same method as in Example 10 except that instead of using the curing accelerator 1 for an oxidative polymerization-type unsaturated resin, the curing accelerator 2' for an oxidative polymerization-type unsaturated resin was added so that a ratio of a cobalt metal component was 0.04% relative to 100 parts of a resin nonvolatile content. The drying time was measured by the same method as in Example 10, and the result is shown in Table 5.

Comparative Example 6

A coating material 3' for comparative reference was prepared by the same method as in Example 10 except that instead of using the curing accelerator 1 for an oxidative polymerization-type unsaturated resin, the curing accelerator 3' for an oxidative polymerization-type unsaturated resin was added so that a ratio of a cobalt metal component was 0.06% relative to 100 parts of a resin nonvolatile content. The drying time was measured by the same method as in Example 10, and the result is shown in Table 5.

TABLE 5

|  | Comparative Example | | |
|---|---|---|---|
|  | 4 | 5 | 6 |
| Coating material | 1' | 2' | 3' |
| Curing accelerator for oxidative polymerization-type unsaturated resin | 1' | 2' | 3' |
| Drying time (hour) | 11.7 | 8.2 | 9.1 |

Example 19

A curing accelerator 10 for an oxidative polymerization-type unsaturated resin of the present invention was prepared by mixing 9 parts of manganese octylate, 25 parts of bismuth octylate, 15 parts of calcium octylate, 2 parts of 2-[(2-dimethylaminoethyl)methylamino]ethanol, 42 parts of mineral spirit, and 7 parts of soybean oil ["Soybean salad oil (S)" manufactured by Nisshin Oillio Group, Ltd.].

Examples 20 and 21

A coating material 10 was prepared by the same method as in Example 10 except that instead of using the curing accelerator 1 for an oxidative polymerization-type unsaturated resin, the curing accelerator 10 for an oxidative polymerization-type unsaturated resin was used. The drying time was measured by the same method as in Example 1, and finger-touch dryness (tackiness) was evaluated according to a method described below. The results are shown in Table 4. Also, in Example 21, finger-touch dryness of the coating material 1 was also evaluated, and the results are shown in Table 6.

<Method for Evaluating Finger-Touch Dryness>

The coating material was applied to a glass plate by using a 3-mill applicator to form a coating film, and a center of a surface of the coating film was lightly touched with a finger to measure a time (finger-touch drying time) required from the formation of the coating film to a state where the finger did not become soiled. The shorter the time, the more excellent finger-touch dryness the coating material had. The finger-touch dryness was evaluated in a constant temperature and humidity chamber (air temperature of 25° C., relative humidity of 50%).

TABLE 6

|  | Example | |
|---|---|---|
|  | 20 | 21 |
| Coating material | 10 | 1 |
| Curing accelerator for oxidative polymerization-type unsaturated resin | 10 | 1 |
| Drying time | 9.1 | 9.1 |
| Finger-touch drying time (hour) | 5.3 | 6.7 |

The invention claimed is:

1. A curing accelerator for an oxidatively polymerized unsaturated resin, the curing accelerator comprising a fatty acid manganese salt (A), an aminoalcohol (B) represented by general formula (1) below,

[Chem. 1]

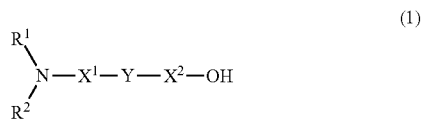

(in the formula, $R^1$ and $R^2$ each independently represent a hydrogen atom or an alkyl group having 1 to 6 carbon atoms, $X^1$ and $X^2$ each independently represent an alkylene group having 2 to 6 carbon atoms, and Y represents —$NR^3$— (wherein $R^3$ represents a hydrogen atom or an alkyl group having 1 to 6 carbon atoms) or an oxygen atom), and at least one fatty acid metal salt (C) selected from the group consisting of a fatty acid bismuth salt, a fatty acid zirconium salt, a fatty acid barium salt, and a fatty acid iron salt.

2. The curing accelerator for an oxidatively polymerized unsaturated resin according to claim 1, wherein the fatty acid metal salt (C) is at least one fatty acid metal salt (C1) selected from the group consisting of a fatty acid bismuth salt, a fatty acid zirconium salt, and a fatty acid barium salt, and the metal salt (C1) is contained so that an amount of a metal in the metal salt (C1) is 1 to 10 parts by mass relative to 1 part by mass of manganese metal in the fatty acid manganese salt (A).

3. The curing accelerator for an oxidatively polymerized unsaturated resin according to claim 1, wherein the fatty acid metal salt (C) is a fatty acid iron salt (C2), and the metal salt (C2) is contained so that an amount of a metal in the fatty acid iron salt (C2) is 0.1 to 2.0 parts by mass relative to 1 part by mass of manganese metal in the fatty acid manganese salt (A).

4. The curing accelerator for an oxidatively polymerized unsaturated resin according to claim 1, wherein the aminoalcohol (B) is at least one selected from the group consisting of 2-[(2-dimethylaminoethyl)methylamino] ethanol, 2-(2-aminoethyl)aminoethanol, 1-(2-aminoethyl)amino-2-propanol, 2-(3-aminopropylamino)ethanol, and 2-(2-dimethylaminoethoxy)ethanol.

5. The curing accelerator for an oxidatively polymerized unsaturated resin according to claim 1, wherein a fatty acid of the fatty acid manganese salt (A) is at least one selected from the group consisting of octylic acid, neodecanoic acid, isononanoic acid, and naphthenic acid.

6. The curing accelerator for an oxidatively polymerized unsaturated resin according to claim 1, wherein a fatty acid of the fatty acid metal salt (C) is at least one fatty acid selected from the group consisting of octylic acid, neodecanoic acid, and naphthenic acid.

7. The curing accelerator for an oxidatively polymerized unsaturated resin according to claim 2, further comprising a fatty acid calcium salt or a fatty acid strontium salt.

8. A printing ink comprising the curing accelerator for an oxidatively polymerized unsaturated resin according to claim 1 and an oxidatively polymerized unsaturated resin.

9. A coating material comprising the curing accelerator for an oxidatively polymerized unsaturated resin according to claim 1 and an oxidatively polymerized unsaturated resin.

10. The curing accelerator for an oxidatively polymerized unsaturated resin according to claim 3, further comprising a fatty acid calcium salt or a fatty acid strontium salt.

11. A printing ink comprising the curing accelerator for an oxidatively polymerized unsaturated resin according to claim 2 and an oxidatively polymerized unsaturated resin.

12. A printing ink comprising the curing accelerator for an oxidatively polymerized unsaturated resin according to claim 3 and an oxidatively polymerized unsaturated resin.

13. A printing ink comprising the curing accelerator for an oxidatively polymerized unsaturated resin according to claim 4 and an oxidatively polymerized unsaturated resin.

14. A printing ink comprising the curing accelerator for an oxidatively polymerized unsaturated resin according to claim 5 and an oxidatively polymerized unsaturated resin.

15. A printing ink comprising the curing accelerator for an oxidatively polymerized unsaturated resin according to claim 6 and an oxidatively polymerized unsaturated resin.

16. A coating material comprising the curing accelerator for an oxidatively polymerized unsaturated resin according to claim 2 and an oxidatively polymerized unsaturated resin.

17. A coating material comprising the curing accelerator for an oxidatively polymerized unsaturated resin according to claim 3 and an oxidatively polymerized unsaturated resin.

18. A coating material comprising the curing accelerator for an oxidatively polymerized unsaturated resin according to claim 4 and an oxidatively polymerized unsaturated resin.

19. A coating material comprising the curing accelerator for an oxidatively polymerized unsaturated resin according to claim 5 and an oxidatively polymerized unsaturated resin.

20. A coating material comprising the curing accelerator for an oxidatively polymerized unsaturated resin according to claim 6 and an oxidatively polymerized unsaturated resin.

* * * * *